(12) United States Patent
Zhang et al.

(10) Patent No.: US 8,737,077 B2
(45) Date of Patent: May 27, 2014

(54) LINKAGE DEVICE

(75) Inventors: Guang-Yi Zhang, Shenzhen (CN); Zhe Zhang, Shenzhen (CN); Bing-Bao Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 344 days.

(21) Appl. No.: 13/284,959

(22) Filed: Oct. 30, 2011

(65) Prior Publication Data
US 2013/0032687 A1 Feb. 7, 2013

(30) Foreign Application Priority Data
Aug. 4, 2011 (CN) .......................... 2011 1 0222439

(51) Int. Cl.
*H02B 1/01* (2006.01)
*F16M 13/00* (2006.01)

(52) U.S. Cl.
USPC .......................................... 361/726; 248/544

(58) Field of Classification Search
USPC ............. 248/220.22, 221.11, 222.13, 223.41, 248/544, 681; 312/223.2; 361/679.32, 726, 361/727
See application file for complete search history.

(56) References Cited

U.S. PATENT DOCUMENTS

| | | | | |
|---|---|---|---|---|
| 2,185,562 A * | 1/1940 | Nielsen | ........................... | 361/817 |
| 2,944,864 A * | 7/1960 | Krivulka | ..................... | 312/332.1 |
| 4,447,858 A * | 5/1984 | Farag et al. | ................... | 361/829 |
| 4,736,332 A * | 4/1988 | Crease | ..................... | 361/679.09 |
| 5,598,318 A * | 1/1997 | Dewitt et al. | ............ | 361/679.57 |
| 6,028,768 A * | 2/2000 | Cipolla | .................... | 361/679.12 |
| 6,193,341 B1 * | 2/2001 | Eizadkhah et al. | ........... | 312/323 |
| 6,781,842 B2 * | 8/2004 | Chen et al. | ..................... | 361/725 |
| 7,187,554 B2 * | 3/2007 | Seki et al. | ...................... | 361/727 |
| 7,699,281 B2 * | 4/2010 | Chen et al. | ................. | 248/284.1 |
| 8,369,080 B2 * | 2/2013 | Huang | ..................... | 361/679.38 |
| 2001/0006453 A1 * | 7/2001 | Glorioso et al. | .............. | 361/685 |
| 2005/0111178 A1 * | 5/2005 | Bradley et al. | ................ | 361/684 |
| 2006/0279184 A1 * | 12/2006 | Chen et al. | ................. | 312/223.2 |
| 2008/0013288 A1 * | 1/2008 | Karstens | ...................... | 361/726 |
| 2008/0074849 A1 * | 3/2008 | Adducci et al. | ............... | 361/724 |
| 2009/0058236 A1 * | 3/2009 | Lin | ............................. | 312/223.2 |
| 2010/0259899 A1 * | 10/2010 | Facusse | ....................... | 361/709 |

* cited by examiner

*Primary Examiner* — Joshua J Michener
*Assistant Examiner* — Chiedu Chibogu
(74) *Attorney, Agent, or Firm* — Novak Druce Connolly Bove + Quigg LLP

(57) ABSTRACT

A linkage device includes a shell, an active arm, a linkage lever, a random arm and at least two fixed poles. The shell includes two side plates and an upper plate interconnecting the two side plates. The active arm and random arm are both arranged horizontally under the upper plate and between the two side plates. The active arm and random arm each comprise a slide rail inclined to a horizontal surface. The slide rail of the random arm has an inclined direction opposite to that of the slide rail of the active arm. The linkage lever is arranged outside the shell. The linkage lever comprises a central portion pivoted to one of the side plates and two ends respectively pivoted to the active arm and random arm. Two of the at least two fixed poles respectively slide into the slide rails of the active arm and random arm.

8 Claims, 5 Drawing Sheets

LINKAGE DEVICE

BACKGROUND

1. Technical Field

The present disclosure generally relates to linkage devices, and particularly to a linkage device capable of performing fixing function.

2. Description of Related Art

In general, a computer is equipped a number of electrical modules to perform corresponding functions. Because the electrical modules are usually fixed to a computer case with screws, the assembly and disassembly of the electrical modules is inconvenient and time consuming.

Therefore, what is needed is to provide a fixing device overcoming above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the present embodiment of a linkage device, in detail.

Figure 1:
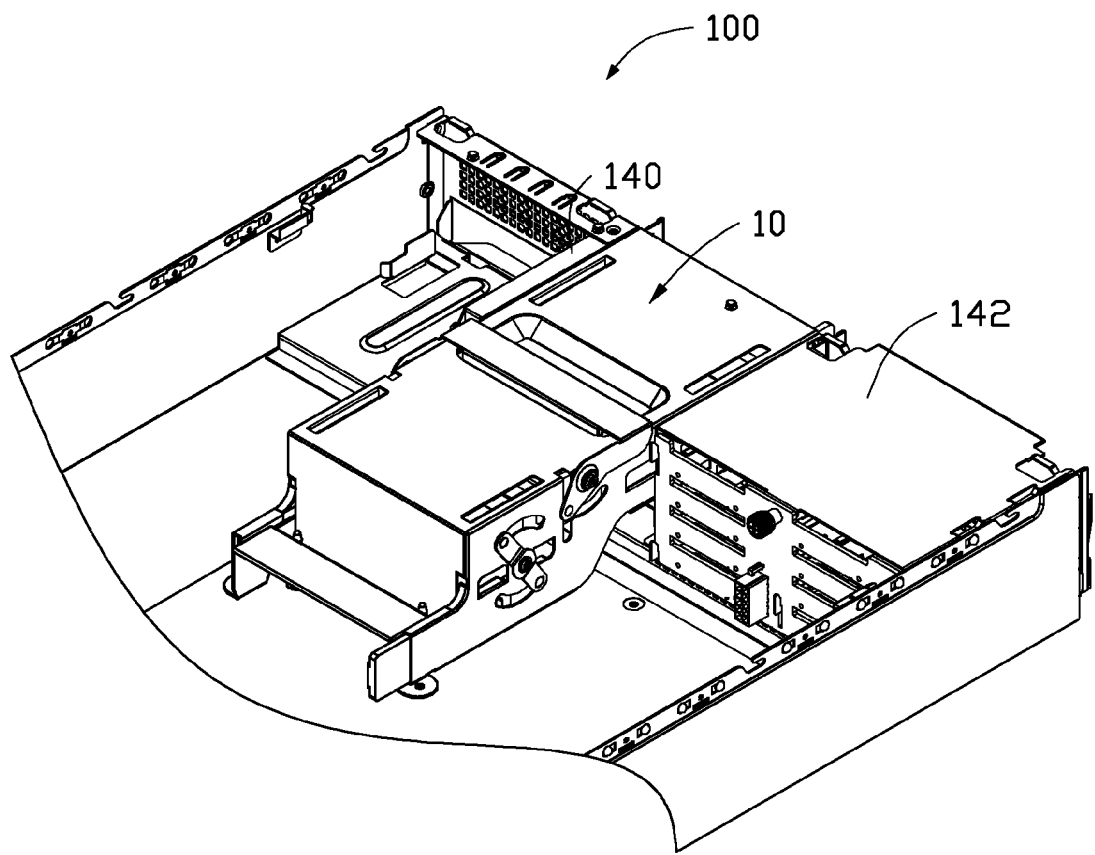
FIG. 1 is a schematic view of a computer equipped with a linkage device in accordance with an embodiment of the present disclosure.
Figure 2:
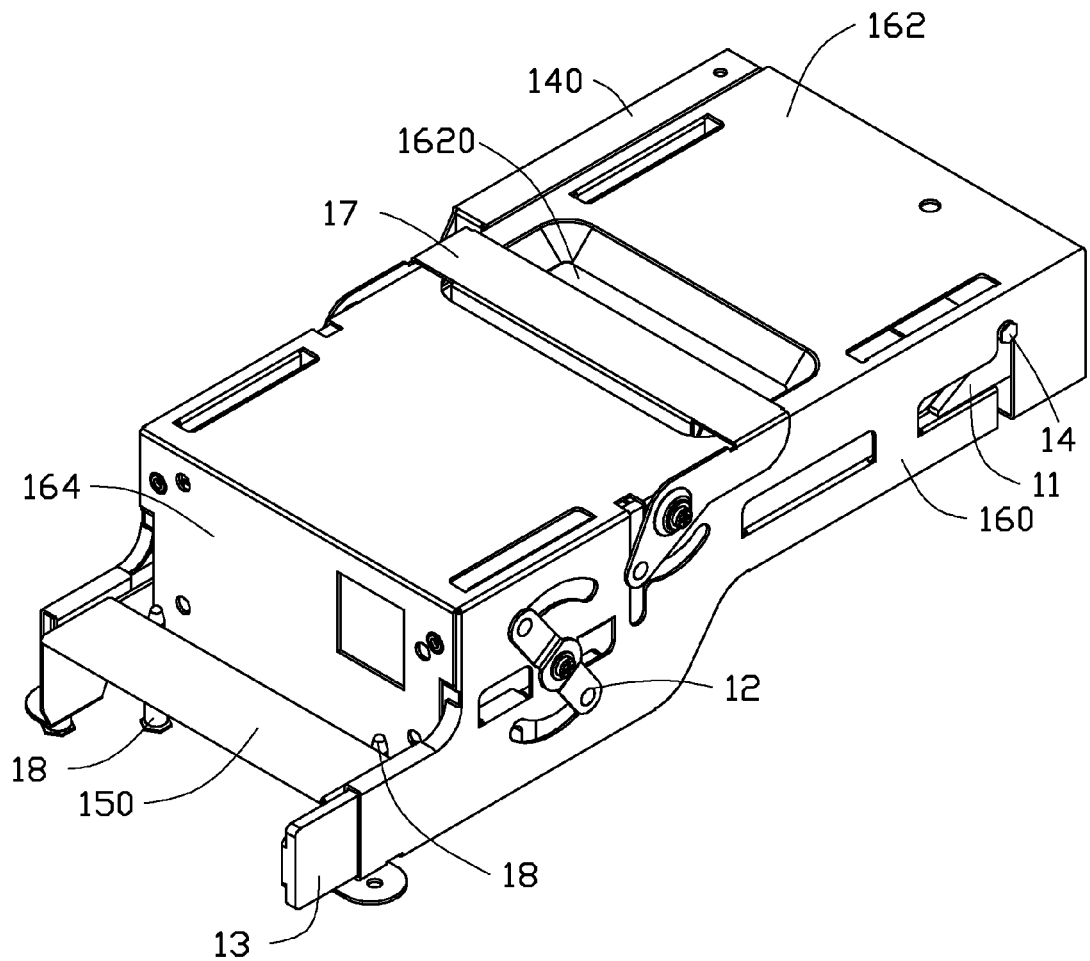
FIG. 2 is a schematic view of the linkage device of FIG. 1.
Figure 3:
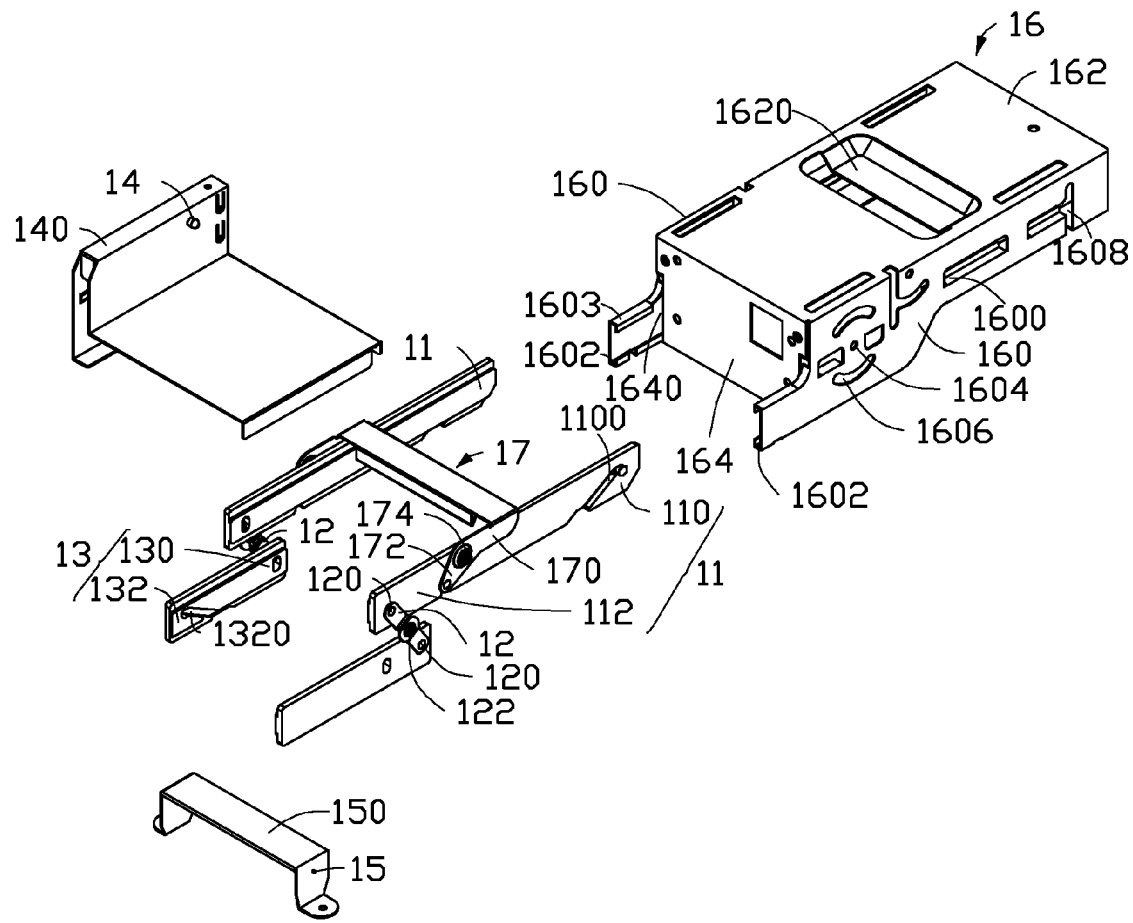
FIG. 3 is an exploded view of the linkage device of FIG. 2.

Referring to FIG. 1, a linkage device 10 capable of being employed in a computer case 100 is provided according to an embodiment. Referring to FIGS. 2 and 3, the linkage device 10 includes an active arm 11, a linkage lever 12, a random arm 13, fixed poles 14 and 15, and a shell 16.

The active arm 11 is an elongated rectangular plate arranged substantially horizontally. The active arm 11 includes two longitudinal end portions 110, 112. The end portion 110 defines a slide rail 1100. The slide rail 1100 is inclined to a horizontal surface where the active arm 11 sits. An included angle between the slide rail 1100 and the horizontal surface is a sharp angle. In this embodiment, the slide rail 1100 has an apex relatively near to the end portion 110 and away from the end portion 112. The end portion 112 is pivoted to the linkage lever 12. The linkage device 10 can include a single active arm 11 or multiple active arms 11. In this embodiment, there are two active arms 11 opposite to each other, the two active arms 11 each define a slide rail 1100, each slide rail 1100 is a groove defined in a surface of a corresponding active arm 11, the surfaces where the two slide rails 1100 sit are away from each other.

The linkage lever 12 is a generally rectangular plate for connecting the active arm 11 with the random arm 13. The linkage lever 12 includes two ends respectively pivotably mounted to the active arm 11 and the random arm 13 by a pivot 120. The linkage lever 12 further includes a central portion pivotably mounted to the shell 16 by a pivot 122. In this embodiment, there are two linkage levers 12.

The random arm 13 is a generally elongated rectangular plate arranged horizontally. The random arm 13 includes two longitudinal end portions 130, 132. The end portion 130 is pivotably mounted to the linkage lever 12. The end portion 132 defines a slide rail 1320. The slide rail 1320 is inclined to a horizontal surface where the random arm 13 sits. An included angle between the slide rail 1320 and the horizontal surface is a sharp angle. In this embodiment, the slide rail 1320 has an apex relatively near to the end portion 132 and away from the end portion 130. The linkage device 10 can include a single random arm 13 or multiple random arms 13. In this embodiment, there are two random arms 13 opposite to each other, the two random arms 13 each define a slide rail 1320, each slide rail 1320 is a groove defined in a surface of a corresponding random arm 13, the surfaces where the two slide rails 1320 sit are facing each other.

The fixed pole 14 is arranged at a side of the active arm 11 and extends into the slide rail 1100. In this embodiment, there are two fixed poles 14. The two fixed poles 14 are respectively fixed on two fixed structures 140, 142 beside the two active arms 11. For showing detail features of the linkage device 10 without being blocked, the fixed structure 140 is only illustrated in FIG. 1-FIG. 3 and the fixed structure 142 is only illustrated in FIG. 1.

The fixed pole 15 is arranged at a side of the random arm 13 and extends into the slide rail 1320. In this embodiment, there are two fixed poles 15. The two fixed poles 15 are fixed on a frame 150. The frame 150 is arranged between the two random arms 13.

The shell 16 includes two opposite side plates 160, an upper plate 162 interconnecting the two side plates 160, and a rear plate 164 contacting the two side plates 160 and the upper plate 162. The two active arms 11 and the two random arms 13 are arranged between the two opposite side plates 160 and under the upper plate 162. The linkage lever 12 is arranged at an outer side of the side plate 160. A gap 1640 remains at the joint of the side plate 160 and the rear plate 164. As such, the end portion 132 of the random arm 13 extends to an outer space of the shell 16, via the gap 1640.

In a further embodiment, the side plates 160 each define a flange 1600 and a flange 1602. The flange 1600 is arranged near to the end portion 110 of the active arm 11 and extends towards the active arm 11, thereby supporting the active arm 11 from below. The flange 1602 is arranged near to the end portion 132 of the random arm 13 and extends towards the random arm 13, thereby supporting the random arm 13 from below. In a still further embodiment, the side plates 160 each define a flange 1603. The two flanges 1603 each extend from an inner surface of a respective side plate 160 towards the random arm 13, and face each other. The flange 1603 is defined above the flange 1602, thereby holding the end portion 132 therebetween.

In addition, each side plate 160 can further define a through hole 1604 therein. Accordingly, the pivot 122 is capable of penetrating the through hole 1604, thereby pivoting the central portion of the linkage lever 12 to the side plate 160.

Each side plate 160 can still further define two arc shaped through holes 1606 therein. Accordingly, the pivot 120 is capable of penetrating through the through hole 1606, thereby pivoting the end of the linkage lever 12 to the active arm 11 and the random arm 13 respectively.

Each side plate 160 can define a through hole 1608. Accordingly, the fixed pole 14 is capable of penetrating the through hole 1608, thereby extending into the slide rail 1100.

Figure 4:
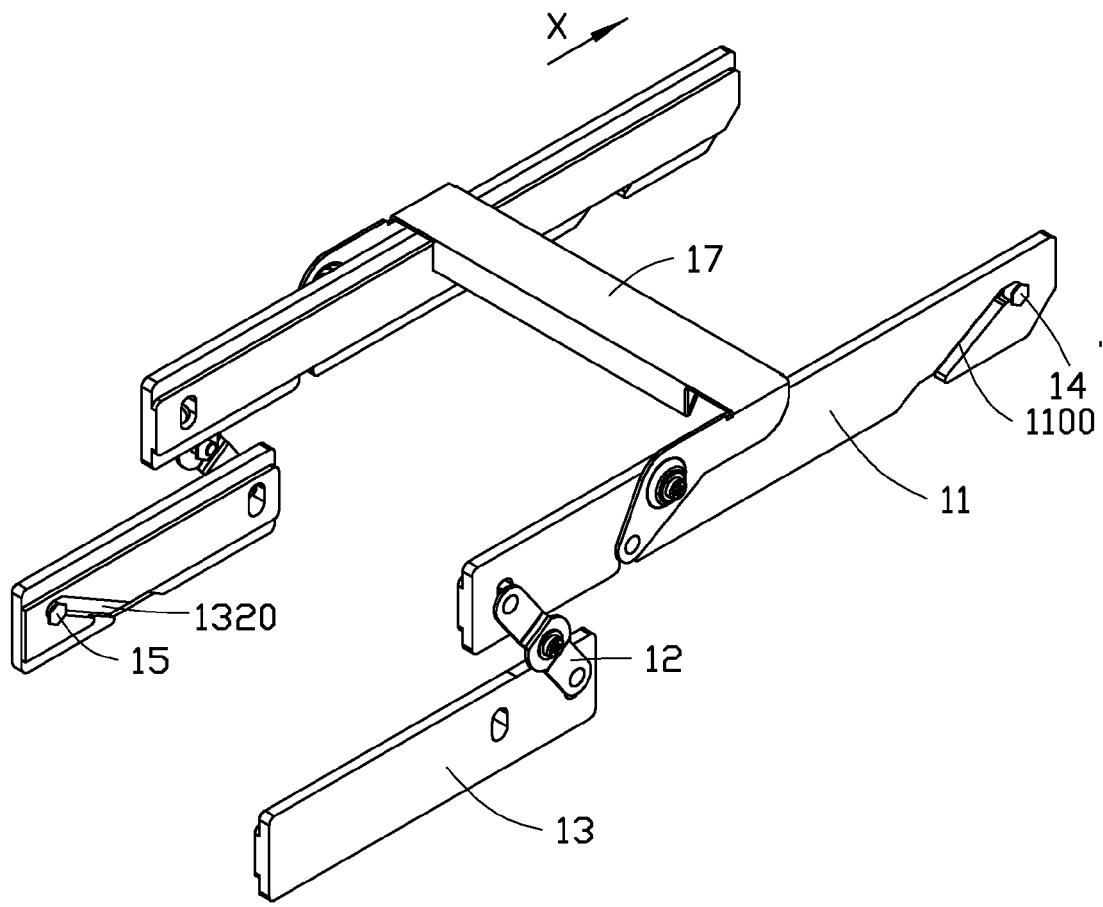
FIG. 4 is a schematic view showing a first state of an active arm, a random arm and a link lever of the linkage device of FIG. 2.

Referring to FIG. 4, the active arms 11, the random arms 13 and the link levers 12 in a first state of the linkage device 10 are illustrated. In the first state of the linkage device 10, the fixed pole 14 sits at the apex of the slide rail 1100, and the fixed pole 15 sits at the apex of the slide rail 1320.

When the active arm 11 is driven to move longitudinally along the horizontal x direction, as illustrated with an arrow, the fixed pole 14 slides relative to the bottom of the slide rail 1100. Due to the fixed pole 14 being fixed on the fixed structure 140 or 142, the active arm 11 also moves upward during the slide of the fixed pole 14. Because the upper end of the linkage lever 12 is pivoted to the active arm 11 and the central portion of the linkage lever 12 is pivoted to the side plate 160 of the shell. The lower end of the linkage lever 12 is driven to move opposite to the x direction when the upper end of the linkage lever 12 moves along the x direction. Accordingly, the random arm 13 is driven by the lower end of the linkage lever 12 to move opposite to the x direction, and the random arm 13 also moves upward while the fixed pole 15 slides relative to the bottom of the slide rail 1320. As a result, the raised active arms 11 and random arms 13 will lift the shell 16 upward.

Figure 5:
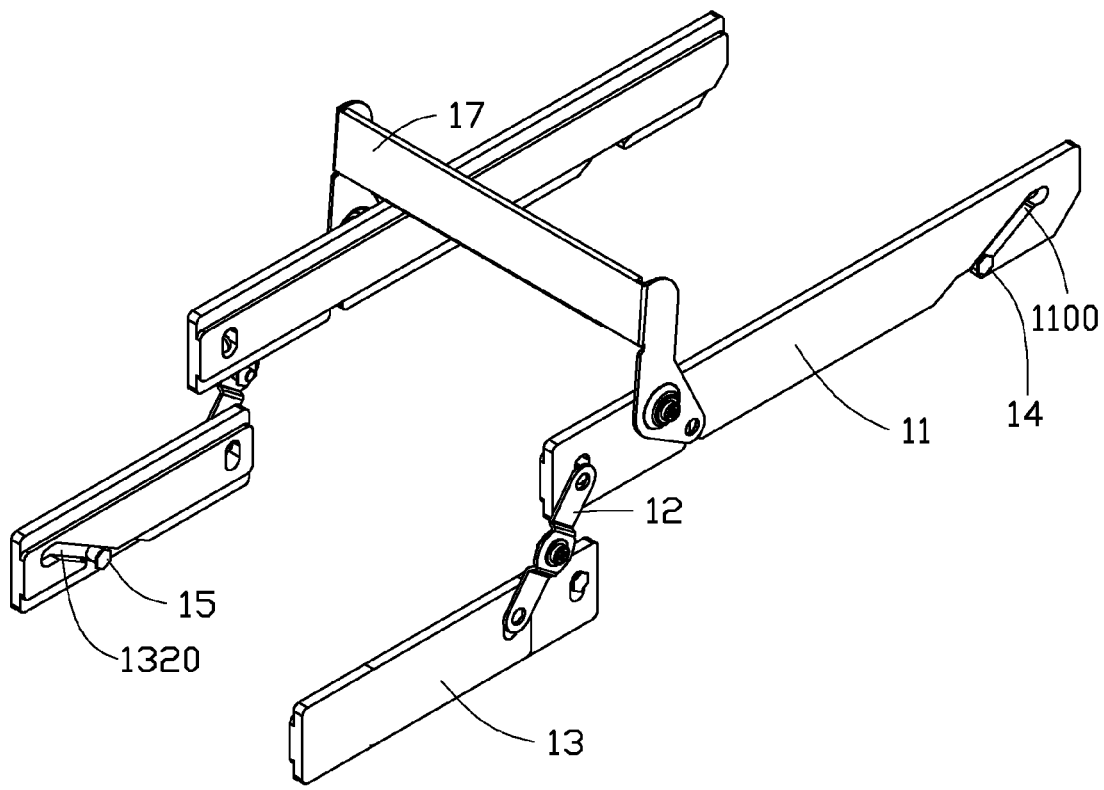
FIG. 5 is a schematic view showing a second state of the active arm, the random arm and the link lever of the linkage device of FIG. 2.

After being moved along the x direction, the active arms 11, the random arms 13 and the link levers 12 are switched to a second state of the linkage device 10, as illustrated in FIG. 5.

When the active arm 11 is driven to move longitudinally opposite to the x direction, the fixed pole 14 slides relative to the apex of the slide rail 1100. Due to the fixed pole 14 being fixed on the fixed structure 140 or 142, the active arm 11 also moves downward during the slide of the fixed pole 14. Because the upper end of the linkage lever 12 is pivoted to the active arm 11 and the central portion of the linkage lever is pivoted to the side plate 160 of the shell. The lower end of the linkage lever 12 is driven to move along the x direction when the upper end of the linkage lever 12 moves opposite to the x direction. Accordingly, the random arm 13 is driven by the lower end of the linkage lever 12 to move along the x direction and the random arm 13 also moves downward while the fixed pole 15 slides relative to the apex of the slide rail 1320. As a result, the lowered active arms 11 and random arms 13 pull the shell 16 downward.

After being moved opposite to the x direction, the active arms 11, the random arms 13 and the link levers 12 are switched back to the first state of the linkage device 10, as illustrated in FIG. 4.

When switched between the first and second states, the linkage device 10 is capable of moving upward and downward. As such, the linkage device 10 can be equipped with at least one post 18 to perform a press of an electrical module to the computer case 100 and a release of the electrical module from the computer case 100 when moving upward and downward. As a result, a fixing function can be achieved.

Furthermore, the shell 16 can be equipped with a handle 17 to drive the active arm 11. Referring back to FIG. 2 through FIG. 4, the handle 17 includes a handling portion 170 and a drive portion 172 connected to each other. A pivot 174 pivots a joint of the handling portion 170 and the drive portion 172 to the side plate 160 of the shell 16. The drive portion 172 further includes a distal end pivotably mounted to the active arm 11. As such, when pulling the handling portion 170 to move clockwise or counterclockwise relative to the pivot 174, the active arm 11 will be driven by the distal end of the drive portion 172 to move opposite to or along the x direction.

Correspondingly, the upper plate 162 can further define a recess 1620 for receiving the handling portion 170 when the handle 17 is pulled down.

The inclined directions of the slide rails 1100 and 1320 can be changed, for example reversed, as long as it is ensured that the inclined directions of the slide rails 1100 and 1320 are opposite to each other. In addition, the included angle between the slide rail 1100 and the horizontal surface can also be equal to the included angle between the slide rail 1320 and the horizontal surface.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A linkage device, comprising:
a shell comprising two side plates and an upper plate interconnecting the two side plates;
an active arm positioned under the upper plate and between the two side plates, the active arm being arranged horizontally and comprising a first slide rail inclined to a horizontal surface;
a random arm positioned under the upper plate and between the two side plates, the random arm being arranged horizontally and comprising a second slide rail inclined to the horizontal surface, the second slide rail of the random arm having an inclined direction opposite to that of the first slide rail;
a linkage lever arranged outside the shell, the linkage lever comprising a central portion pivoted to one of the side plates and two ends respectively pivoted to the active arm and the random arm; and
at least two fixed poles, one of the at least two fixed poles sliding in the first slide rail of the active arm and another one of the at least two fixed poles sliding in the second slide rail of the random arm when the random arm and the active arm move longitudinally in two opposite directions;
wherein the shell further comprises a rear plate contacting the two side plates and the upper plate, and a gap is defined at the joint of each side plate and the rear plate, an end portion of the random arm extending to the outside of the shell via the gap.

2. The linkage device of claim 1, further comprising a handle connected to the active arm, the handle being for driving the active arm to move longitudinally.

3. The linkage device of claim 2, wherein the handle comprises a handling portion and a driving portion connected to each other, a joint of the handling portion and the driving portion is pivoted to one of the side plates of the shell, the driving portion further comprises a distal end pivoted to the active arm, the active arm is driven by the distal end of the driving portion to move forward or backward when the handling portion moves clockwise or counterclockwise relative to the first pivot.

4. The linkage device of claim 1, wherein one side plate of the shell comprises a first through hole defined therein, one of the at least two fixed poles penetrating through the first through hole thereby extending into the first slide rail of the active arm.

5. The linkage device of claim 1, wherein one side plate of the shell comprises a first flange extending towards the active arm, the first flange supporting the active arm from below.

6. The linkage device of claim 5, wherein the side plate of the shell further comprises a second flange extending towards the random arm, the second flange supporting the random arm from below.

7. The linkage device of claim 6, wherein the side plate of the shell further comprises a third flange extending towards the random arm, the third flange being positioned above and facing the second flange, the second flange and the third flange cooperatively holding the random arm therebetween.

8. The linkage device of claim 1, wherein an included angle between the first slide rail and the horizontal surface is equal to an included angle between the second slide rail and the horizontal surface.

\* \* \* \* \*